US012695806B2

(12) United States Patent
Katyal et al.

(10) Patent No.: US 12,695,806 B2
(45) Date of Patent: Jul. 28, 2026

(54) SYNCHRONIZED MULTI-CHANNEL COMMUNICATION ENABLING ACCESSIBILITY FOR COLLECTING DATA

(71) Applicant: Telefonaktiebolaget LM Ericsson (publ), Stockholm (SE)

(72) Inventors: Ganish Katyal, Oakville (CA); Luciano Rosa, Milton (CA); Plamen Stanoev, Oakville (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 18/710,001

(22) PCT Filed: Nov. 18, 2021

(86) PCT No.: PCT/IB2021/060721
§ 371 (c)(1),
(2) Date: May 14, 2024

(87) PCT Pub. No.: WO2023/089363
PCT Pub. Date: May 25, 2023

(65) Prior Publication Data
US 2025/0016234 A1　　Jan. 9, 2025

(51) Int. Cl.
H04L 67/141 (2022.01)
H04L 67/306 (2022.01)

(52) U.S. Cl.
CPC .......... H04L 67/141 (2013.01); H04L 67/306 (2013.01)

(58) Field of Classification Search
None
See application file for complete search history.

(56) References Cited

U.S. PATENT DOCUMENTS

| | | | | |
|---|---|---|---|---|
| 2007/0174429 A1 * | 7/2007 | Mazzaferri | ........... | H04L 63/102 709/218 |
| 2020/0014642 A1 * | 1/2020 | Sidi | ..................... | H04M 3/5141 |
| 2020/0213114 A1 * | 7/2020 | Sarin | ..................... | H04L 9/3231 |
| 2021/0092116 A1 * | 3/2021 | Zimmermann | ..... | H04L 63/0823 |

FOREIGN PATENT DOCUMENTS

| | | | | |
|---|---|---|---|---|
| AU | 2014323444 A1 * | 5/2016 | .......... | H04M 3/5166 |
| WO | WO-2009009167 A1 * | 1/2009 | ......... | H04L 65/1095 |

OTHER PUBLICATIONS

International Search Report and Written Opinion dated Aug. 4, 2022 issued in PCT Application No. PCT/IB2021/060721 filed Nov. 18, 2021, consisting of 13 pages.

* cited by examiner

*Primary Examiner* — Tonia L Dollinger
*Assistant Examiner* — Ishrat Rashid
(74) *Attorney, Agent, or Firm* — Weisberg I.P. Law, P.A.

(57) ABSTRACT

A method performed by a first network node that is in communication with a support node. The support node is configured to communicate with a first user node using a first communication channel of a logical communication session. The method includes receiving user account data associated with a user of the first user node, receiving, from the support node, a session request to initiate a second communication channel of the logical communication session, and configuring the second communication channel between the first network node and at least one of the first user node and a second user node, based on the session request and the user account data.

14 Claims, 6 Drawing Sheets

User Node
14a

User
interface
unit 50

16a

12a

. . .

User
Node
14b

16b

32

30

Support
Configuration
Unit 34

Support
Representative
User Interface
36

12n

29

20

26

Complementary
Channel
Configuration Unit
28

18

Business
Process
Orchestrator
Unit 22

Business
System
Backend Unit
24

SYNCHRONIZED MULTI-CHANNEL COMMUNICATION ENABLING ACCESSIBILITY FOR COLLECTING DATA

CROSS-REFERENCE TO RELATED APPLICATION

This application is a Submission Under 35 U.S.C. § 371 for U.S. National Stage Patent Application of International Application Number: PCT/IB2021/060721, filed Nov. 18, 2021 entitled "SYNCHRONIZED MULTI-CHANNEL COMMUNICATION ENABLING ACCESSIBILITY FOR COLLECTING DATA," the entirety of which is incorporated herein by reference.

TECHNICAL FIELD

Network communications, and in particular, communication using multiple channels in a synchronized logical communication session.

BACKGROUND

The current landscape of customer support is driven by a customer reaching out for support via a communication technology and respective enabler. Some of these enablers include, for example, a digital chatbot automated and/or powered by a human, a phone call that could lead to an interactive voice application, IVR, supporting the call, which in most cases lead and/or redirect the customer to a customer support representative (CSR). For example, the customer may be seeking to purchase a good, service, or subscription, such as buying an airline ticket, subscribing to a new phone plan, purchasing an insurance policy, and/or the customer may be seeking to change some aspects of an existing service subscription.

In this process, the CSR may require information from the customer, for example, identifying information, such as name, date of birth, social security number, and driver's license identification number; authentication information, such as passcodes, pass phrases, and/or secret question answers; and/or information from the customer related to a customer's purchase or subscription, such as credit card information, airline flight time and date, and/or subscription plan selections.

FIG. 1 is a signaling diagram illustrating an example communication system for customer support. A user node 2, such as a telephone, communicates with a support node 4, such as a device operated by a customer service representative, CSR. The support node 4 communicates with a business system node 6. At step S100, the user node 2 initiates a phone call to the support node 4. At step S102, the user node 2 sends a request to the support node 4, such as a request to purchase a subscription. At step S104, the support node 4 communicates to the business system node 6 to fetch information and/or perform actions. At step S106, the support node 4 prompts information from the user node 2, such as a request for the user's credit card information, name, and date of birth. At step S108, the user node 2 provides the requested information to the support node 4, e.g., by verbally reciting it via the phone connection. At step S110, the support node 4 passes the collected information received from the user node 2 to the business system node 6, e.g., by the CSR entering the verbally-recited information into the support node 4's user interface and forwarding the entered information to the business system node 6. At step S112, the business system node 6 provides a confirmation that the collected information is accurate and authenticated. At step S114, the support node 4 passes along information to the user node 2, such as a confirmation that the purchase was successfully completed.

In the above example, the CSR is an entity in the middle for sending any information to the backend business system node 6 (e.g., a quote and purchase order) and in that process captures input data from the customer over voice. The conversation, such as reciting street addresses and names, may be difficult and lack accessibility, but at the same time sensitive information like credit card information is tunneled via the CSR, who has access to potentially sensitive data. This is both a security risk and is also error prone as the CSR enters the customer's data into the business system node 6 backend.

Hence, data exchange in existing systems suffers from various issues.

SUMMARY

It is therefore desirable to have a system for customer support that secures and/or hides sensitive information from certain parties, such as the CSR, and also provides improved communication and accessibility between a customer and a CSR as compared with existing arrangements.

Embodiments of the present disclosure enable the use of more than one channel (improved accessibility) under a logical communication session, and allow seamless push or pull of information from two heterogenous technology sessions into a one logical end to end user "journey."

The advantages of one or more embodiments described herein are that a CSR and end user (or for that matter, any two distinct parties, where one is acting as an assisted channel on behalf of a backend system like a business support system, BSS, or a travel booking system) can communicate, send, and receive information on a more verbose/accessible channel, like a web page, to complement the data for the phone call towards the assisted channel. Additionally, security may be improved as compared with existing arrangements by the use of a secure, complementary channel, which bypasses the CSR, for communicating sensitive data between the end user and the backend system. The advantages include improved security and improved accessibility.

Some embodiments advantageously provide a method and system for a first network node that is in communication with a support node. The support node is configured to communicate with a first user node using a first communication channel of a logical communication session. The method includes receiving user account data associated with a user of the first user node, receiving, from the support node, a session request to initiate a second communication channel of the logical communication session, and configuring the second communication channel between the first network node and at least one of the first user node and a second user node, based on the session request and the user account data.

In an embodiment, the first communication channel and second communication channel are synchronized to a predefined business process associated with the logical communication session. In an embodiment, the initiation of the second communication channel is configured to occur at a first time instance for a first type of predefined business process, and at a second time instance for a second type of predefined business process, wherein the second time instance is different from the first time instance. In an embodiment, configuring the second communication channel includes sending a request to a complementary communication system, receiving a session token for the second communication channel, communicating the session token to the first network node by at least one of sending the session token to the support node along with an instruction to the support node to share the session token with at least one of the first user node and the second user node, sending the session token to a user email address identified in the user account data, and sending the session token as a push request to at least one user application identified in the user account data and associated with at least one of the first user node and the second user node 14b; and authenticating the second communication channel using the session token.

In an embodiment, the first network node receives a fetch request from the support node, and sends a data request to the complementary communication system for forwarding through the second communication channel to at least one of the first user node and the second user node. The first network node receives, from the complementary communication system, in response to the data request, user input data through the second communication channel from at least one of the first user node and the second user node. The first network node validates the received user input data, forwards the validated user input data to the support node, and receives, in response to the forwarding, a confirmation message from the support node. The first network node, in response to the confirmation message, terminates the second communication channel.

In an embodiment, the first network node receives a fetch request from the support node, where the fetch request is associated with a predefined business process. In response to the fetch request, the first network node sends a data request to the complementary communication system for forwarding through the second communication channel to at least one of the first user node and the second user node based on the fetch request and the predefined business process. The first network node receives, from the complementary communication system, in response to the data request, user input data through the second communication channel from at least one of the first user node and the second user node, where the user input data is inaccessible by the support node. The first network node performs at least one transaction associated with the user input data and sends an instruction to the support node 30, where the instruction is based on a status of the predefined business process.

In an embodiment, when the first network node sends, through the second communication channel, the data request, the first network node generates a data packet based on the fetch request, the user account data, and the predefined business process, where the data packet is configured to communicate with a user interface of at least one of the first user node and the second user node, allowing access to at least one of the first user node and the second user node to at least one of the first user node and the second user node to at least one of a webpage, an application, an image, and a portable document format, PDF, document, via the complementary communication system, based on a format of the generated data packet.

In an embodiment, the first communication channel is voiced-based, and the second communication channel is data-based. In an embodiment, a support node in communication with a first network node configures a first communication channel of a logical communication session between the support node and a first user node, and sends, to the first network node, a session request to initiate a second communication channel of the logical communication session. The second communication channel is between the first network node and at least one of the first user node and a second user node. In an embodiment, the first communication channel and second communication channel are synchronized to a predefined business process associated with the logical communication session.

In some embodiments, the second communication channel bypasses the support node, such that the support node is unable to view any communications transported via the second communication channel.

According to another aspect of the present disclosure, a first network node that is in communication with a support node is provided. The support node is configured to communicate with a first user node using a first communication channel of a logical communication session comprises processing circuitry configured to receive user account data associated with a user of the first user node, receive, from the support node, a session request to initiate a second communication channel of the logical communication session, and configure the second communication channel between the first network node and at least one of the first user node and a second user node, based on the session request and the user account data.

In an embodiment, the first communication channel and second communication channel are synchronized to a predefined business process associated with the logical communication session.

In an embodiment, the initiation of the second communication channel is configured to occur at a first time instance for a first type of predefined business process, and at a second time instance for a second type of predefined business process, the second time instance being different from the first time instance.

In an embodiment, configuring of the second communication channel comprises sending a request to a complementary communication system, receiving a session token for the second communication channel, communicating the session token to the first network node by at least one of: sending the session token to the support node along with an instruction to the support node to share the session token with at least one of the first user node and the second user node, sending the session token to a user email address identified in the user account data, and sending the session token as a push request to at least one user application identified in the user account data and associated with at least one of the first user node and the second user node, and authenticating the second communication channel using the session token.

In an embodiment, the processing circuitry is further configured to receive a fetch request from the support node, send a data request to the complementary communication system for forwarding through the second communication channel to at least one of the first user node and the second user node, receive, from the complementary communication system, in response to the data request, user input data through the second communication channel from at least one of the first user node and the second user node, validate the received user input data, forward the validated user input data to the support node, receive, in response to the forwarding, a confirmation message from the support node, and in response to the confirmation message, terminate the second communication channel.

In an embodiment, the processing circuitry is further configured to receive a fetch request from the support node, the fetch request being associated with a predefined business process, in response to the fetch request, send a data request to the complementary communication system for forwarding through the second communication channel to at least one of the first user node and the second user node based on the fetch request and the predefined business process, receive, from the complementary communication system, in response to the data request, user input data through the second communication channel from at least one of the first user node and the second user node, the user input data being inaccessible by the support node, perform at least one transaction associated with the user input data, and send an instruction to the support node, the instruction being based on a status of the predefined business process.

In an embodiment, sending, through the second communication channel, the data request comprises generating a data packet based on the fetch request, the user account data, and the predefined business process, the data packet being configured to communicate with a user interface of at least one of the first user node and the second user node, and allowing access to at least one of the first user node and the second user node to at least one of the first user node and the second user node to at least one of a webpage, an application, an image, and a portable document format, PDF, document, via the complementary communication system, based on a format of the generated data packet.

In an embodiment, the first communication channel is voiced-based, and the second communication channel is data-based.

According to another aspect of the present disclosure, a support node in communication with a first network node is provided. The support node comprises processing circuitry configured to configure a first communication channel of a logical communication session between the support node and a first user node and send, to the first network node, a session request to initiate a second communication channel of the logical communication session, the second communication channel being between the first network node and at least one of the first user node and a second user node.

In an embodiment, the first communication channel and second communication channel are synchronized to a predefined business process associated with the logical communication session.

In an embodiment, the second communication channel bypasses the support node, such that the support node is unable to view any communications transported via the second communication channel.

According to another aspect of the present disclosure, a method performed by a support node in communication with a first network node is provided. The method includes configuring a first communication channel of a logical communication session between the support node and a first user node, and sending, to the first network node, a session request to initiate a second communication channel of the logical communication session where the second communication channel is between the first network node and at least one of the first user node and a second user node.

According to one or more embodiments, the first communication channel and second communication channel are synchronized to a predefined business process associated with the logical communication session. According to one or more embodiments, the second communication channel bypasses the support node, such that the support node is unable to view any communications transported via the second communication channel.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
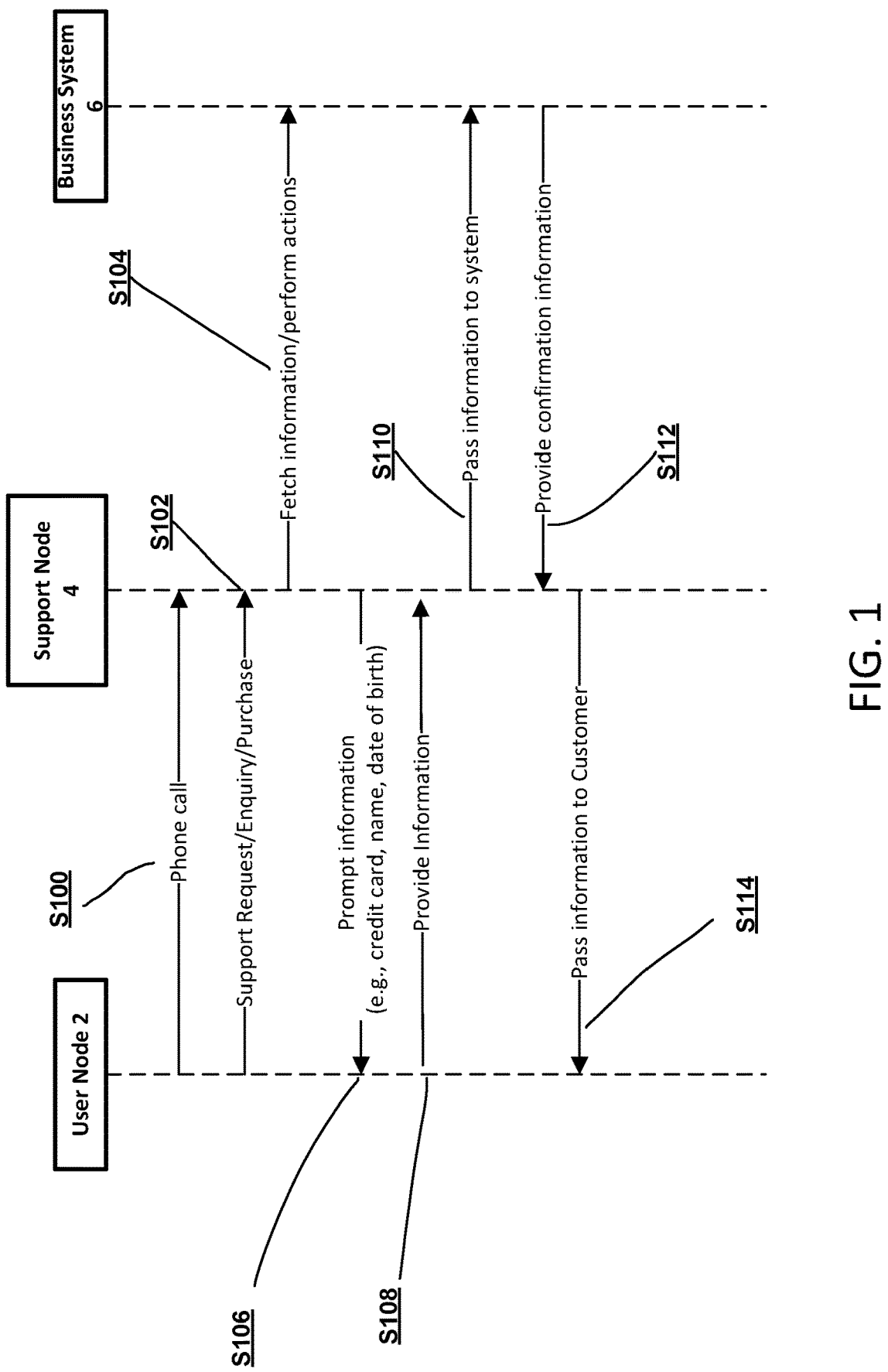
FIG. 1 is a diagram of an example communication system for customer support.

As described above, the current landscape of Customer Support is typically driven by a customer reaching out for support via some digital technology and respective enabler. Some of these enablers include, but are not limited to, a digital chatbot (either automated and/or powered by a human) and a phone call that could lead to an interactive voice application supporting the call (IVR) which in most cases leads or redirects the customer to a person. Once the customer reaches such a CSR (Customer Support Representative), the CSR initiates a support case and a respective interaction. For example, a customer may request:

To buy a new phone plan;

To buy an insurance policy;

To change some aspects of my existing phone subscription or any other service subscription for that matter; or Help booking airline tickets.

As the customer support process continues on that assisted channel, the human on the other side of the phone and/or digital chatbot might need some sensitive information to help the customer with the request. For example:

"Can you provide me your credit card details?";

"Can you share your SIN/Tax Identity number?";

"Can you answer this secret question answer—what was the name of your first school?"; or "Can you provide your name, date of birth, and passport details for airline tickets?".

Finally, in some scenarios, the last step of the customer support process would require a confirmation from the end user. For example:

"I have your tickets ready, they are for X date, Y time, and N name on the ticket. Please confirm this information is correct."

"I have sent you an email with all details."

With traditional approaches, this process is asynchronous in nature, for example, a customer may receive an email from the CSR after a few seconds to a few hours. Further, in the traditional approach, the information is either recited by the customer on the phone to the CSR or in some other cases could be captured by keying in information on a phone keypad, such as to a digital chatbot.

There are two problems in the traditional approaches for exchanging information between a customer and a CSR:

Problem 1: In cases where the information is sensitive (like social security identification, credit card info, answers to secret questions), such as for confirming the customer's identity, it is not desirable to read that information out to a CSR who could remember the information and/or note it down and subsequently use such information improperly, such as for fraudulent purposes, or could leak the information to unauthorized parties.

Problem 2: In cases where the information is not necessarily sensitive, but is difficult and/or complicated for the customer and/or CSR to recite via a voice or text-based communication channel (e.g., a geographic place name which has an uncommon spelling, such as a complex street name for a hotel in India being recited to an insurance agent in the United States of America who is unfamiliar with that name, and may not be trained in phonetic alphabet scheme). As another example, the CSR/assisted channel person may need to recite some information back to the end user for confirmation of some details, e.g., confirming the phone plan the end user is offered, enabling the end user to understand what the end user would be paying monthly, any requisite upfront payments, etc., before he or she decides to finalize the transaction, but such details may be too verbose for the CSR to efficiently recite via a voice-based or text-based communication channel, and further, such recitation may be prone to error.

The present disclosure at least in part solves these scenarios (Problem 1 and Problem 2), where it is best to avoid the CSR at times from seeing sensitive information himself and/or where information may or may not be sensitive but is difficult to recite or not even possible to recite (e.g. a person ordering a phone being able to see the images with all colors available), among other reasons why certain information is treated differently.

Before describing in detail example embodiments, it is noted that the embodiments reside primarily in combinations of apparatus components and processing steps related to synchronized communication channels in a communication system for customer support. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

The term "node" used herein can be any kind of node in a communications network which may further comprise any of user nodes, support nodes, business support system nodes, and/or complementary communication nodes configurable for data and/or voice communications over one or more wired or wireless networks.

The term "primary communication channel" (also referred to as a "primary communication session") used herein can be any type of communication channel, such as a voice-based or data-based communication channel, capable of transmitting voice and/or data communications between a user node and a support node. Non-limiting examples include a plain-old-telephone service (PoTS) connection, a cellular telephone connection, a packet-based voice connection, such as voice-over-internet protocol (VoIP), a text message-based communication, an internet chat service, etc. Such communications may be encrypted using standard techniques known in the art.

The term "complementary communication channel" (also referred to as a "complementary communication session," "secondary communication channel/session," "slave communication channel/session," and/or "parallel communication channel/session") used herein can be any type of communication channel capable of data communications between a user node and a complementary communication service. Non-limiting examples include a packet-based network connection, such as via a public internet connection, an intranet connection, etc. Such communications may be encrypted using standard techniques known in the art.

The term "synchronized logical communication session" used herein refers to the combining of the primary communication channel (or session) and the complementary communication channel (or session), as defined above, into a single logical communication session, such that the primary communication channel and the complementary communication channel are both associated with the same user, business support system, i.e., business system, business process instance, and/or customer support representative.

The term "business support system node" (BSS node) used herein may be a system/node, such as a back-end system/node, from which the customer/end-user requires assistance with a specific "journey" and/or use case. A BSS node may include, for example a system for managing, purchasing, and/or modifying a cellular phone plan; a system for booking and/or modifying an airline reservation and/or hotel reservation; or a system for managing, purchasing, and/or modifying an insurance plan.

The term "customer support representative" (CSR) used herein may be a human using the assisted channel via a support node. For example, the customer may have an issue and requires a CSR/support node to assist the customer with a journey and/or use case to be performed on a BSS node. The CSR/support node, for example, does not own any data and/or have any relation with the data model in the BSS node, except that the CSR/support node is acting on behalf of the customer and/or business organization.

Note further, that functions described herein as being performed by a node may be distributed over a plurality of nodes. In other words, it is contemplated that the functions of the node described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 2:
FIG. 2 is a diagram of an example system according to the principles disclosed herein.

Referring again to the drawing figures, in which like elements are referred to by like reference numerals, there is shown in FIG. 2 a schematic diagram of a communication system 10, according to an embodiment, which comprises one or more networks 12a-12n. Each network 12a-12n is connectable to user nodes 14a and 14b over wired or wireless connections, 16a and 16b, respectively. A business support system, BSS node 18, is connectable to one or more networks 12a-12n over wired or wireless connection 20. BSS node 18 may include a business process orchestrator unit 22 for directing the flow of interactions, data, and communications between elements and components of system 10 and a BSS backend unit 24 for storing, sending, and/or receiving business process data, such as customer account data and payment processing information (e.g., credit card details, bank account information, etc.).

A complementary communication system 26 is connectable to one or more networks 12a-12n over wired or wireless connection 29. The complementary communication system 26 may include a complementary channel configuration unit 28 for configuring a complementary communication channel between a user node, such as user node 14a, and the support node 30.

A support node 30 is connectable to one or more networks 12a-12n over wired or wireless connection 32, and includes support configuration unit 34 for sending and receiving instructions/directions and data from BSS node 18 and/or business process orchestrator unit 22 and support representative user interface 36 for displaying data to a user of support node 30, such as a customer support representative, and for receiving input data from a user of support node 30.

User node 14a may be implemented by any device capable of voice communication, including a landline telephone, a cellular telephone, a smartphone, or other voice-enabled communication device known in the art. User node 14b may be any device capable of data communication, including a cellular telephone, a smartphone, a smart watch, a tablet computer, personal computer, etc. In some embodiments, user node 14b is a separate device from user node 14a. For example, user node 14a may be a landline telephone, and user node 14b may be a smart phone. In another example, user node 14a may be a smart phone, and user node 14b may be a laptop PC, desktop PC, or tablet. In another example, user node 14a and user node 14b may be implemented in the same physical device, such as a smart phone with both telephone capability and web browser capability. User node 14a and/or user node 14b may include user interface unit 50 for displaying data to a user and receiving input from a user, such as a customer.

Referring back to the BSS node 18, the BSS node 18 may be configurable for direct/indirect communication, via one or more networks 12a-12n, with support node 30, with complementary communication system 26, with user nodes 14a and 14b, and/or any other component/node of system 10. Although BSS node 18 is described as remote from the user nodes 14a and 14b, complementary communication system 26, and from support node 30, BSS node 18 may be collocated with user nodes 14a and 14b, complementary communication system 26, and/or support node 30. BSS node 18 functionality may be performed by a single node or may be distributed among multiple nodes, servers, and/or computing devices. For example, BSS node 18 functionality, as described herein, may be performed by an on-site or off-site server. Alternatively, BSS node 18 functionality may be performed by several computing devices that may be located in the same general location or different locations, e.g., cloud computing. In other words, each computing device may perform one or more particular sub-processes of BSS node 18, and may communicate with each other via one or more networks 12a-12n.

Business process orchestrator unit 22 may be implemented in any device, either standalone or part of BSS node 18, configurable for performing one or more BSS node 18 functions as described herein such as directing the flow of interactions, data, and communications with user node 14a, user node 14b, support node 30, BSS backend unit 24, and/or complementary communication system 26.

BSS backend unit 24 may be implemented in any device, either standalone or part of BSS node 18, configurable for performing one or more BSS node 18 functions as described herein such as storing, sending, and/or receiving business process data, such as customer account data and payment processing information (e.g., credit card details, bank account information, etc.).

Referring back to support node 30, support node 30 may be implemented by any device capable of voice and data communication, including a personal computer, server, smart phone, or other voice- and data-enabled communication device known in the art.

Support configuration unit 34 may be implemented in any device, either standalone or part of support node 30, configurable for performing one or more support node 30 functions as described herein such as sending and receiving instructions/directions and data from BSS node 18 and/or business process orchestrator unit 22, and configuring a primary communication channel between a user node, such as user node 14a, and the support node 30.

Support representative user interface 36 may be implemented in any device, either standalone or part of support node 30, configurable for performing one or more support node 30 functions as described herein such as displaying data to a user of support node 30, such as a customer support representative, and for receiving input data from a user of support node 30.

Referring back to complementary communication system 26, complementary communication system 26 may be configurable for direct/indirect communication, via one or more networks 12a-12n, with support node 30, with complementary communication system 26, with user nodes 14a and 14b, and/or any other component/node of system 10. Although complementary communication system 26 is described as remote from the user nodes 14a and 14b and from BSS node 18, complementary communication system 26 may be collocated with user nodes 14a and 14b and/or BSS node 18. Complementary communication system 26 functionality may be performed by a single node or may be distributed among multiple nodes, servers, and/or computing devices. For example, complementary communication system 26 functionality, as described herein, may be performed by an on-site or off-site server. Alternatively, complementary communication system 26 functionality may be performed by several computing devices that may be located in the same general location or different locations, e.g., cloud computing. In other words, each computing device may perform one or more particular sub-processes of complementary communication system 26, and may communicate with each other via one or more networks 12a-12n.

Complementary channel configuration unit 28 may be implemented in any device, either standalone or part of complementary communication system 26, configurable for performing one or more complementary communication system 26 functions as described herein such as initiating, authenticating, coordinating, and/or terminating a complementary communication channel, such as with user node 14b.

Example implementations, in accordance with one or more embodiments, of system 10 discussed in the preceding paragraphs will be described with reference to FIG. 3.

The user node 14a includes hardware 38. The hardware 38 may include processing circuitry 40. The processing circuitry 40 may include a processor 42 and a memory 44. In particular, in addition to or instead of a processor, such as a central processing unit, and memory, the processing circuitry 40 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 42 may be configured to access (e.g., write to and/or read from) the memory 44, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Further, memory 44 may be configured as a storage device.

User node 14a may include a communication interface 46 enabling it to communicate directly/indirectly with any component/device of system 10. For example, communication interface 46 may be configured for setting up and maintaining at least a wireless/wired connection with any component/device of system 10 such as support node 30 and/or complementary communication system 26. The communication interface 46 may be formed as or may include, for example, one or more wired communication devices, such as USB and/or ethernet devices, and/or may include one or more wireless communication devices, including one or more RF transmitters, one or more RF receivers, and/or one or more RF transceivers.

User node 14a further has software 48 stored internally in, for example, memory 44, or stored in external memory (e.g., database, storage array, network storage device, etc.) accessible by the user node 14a via an external connection.

The processing circuitry 40 may be configured to control any of the methods and/or processes described herein and/or to cause such methods, and/or processes, to be performed, e.g., by user node 14a. Processor 42 corresponds to one or more processors 42 for performing user node 14a functions described herein. The memory 44 is configured to store data and/or files, e.g., security tokens/keys, programmatic software code, and/or other information described herein. In some embodiments, the software 48 may include instructions that, when executed by the processor 42 and/or processing circuitry 40, cause the processor 42 and/or processing circuitry 40 to perform the processes described herein with respect to user node 14a. For example, processing circuitry 40 may include user interface unit 50 that is implemented in a mobile application, such as an iPhone or Android application, in a web browser accessible on the user node 14a, or similar device which is physically and/or logically separate from user node 14a. As another example, user node 14a may include a user's mobile wireless device, tablet, computer, etc., which includes user interface unit 50 described herein.

User interface unit 50 may be configured to display a web form, application form, application notification, etc., for instructing the user to input data. User interface unit 50 may be configured to display a document to the customer/user, such as a summary of the customer's subscription plan, an invoice, a contract, etc. User interface unit 50 may be configured to receive data input from the customer/user, such as a session token, customer information, credit card details, an electronic signature, etc. User interface unit 50 may be configured to display a push notification to the customer/user, e.g., requesting approval or denial, and to receive a response from the customer/user, e.g., the customer/user selects the "Approve" button or selects the "Deny" button.

In addition to user node 14a, the system 10 may include additional user nodes 14, such as user node 14b, depicted in FIG. 2, which may include functionally similar hardware and/or software components as another user node 14, e.g., user node 14a which is a type of user node 14. For example, user node 14b may be a mobile phone or other user device which is configured to communicate with complementary communication system 26, BSS node 18, and/or any other component of system 10.

The system 10 further includes support node 30 including hardware 52. The hardware 52 may include processing circuitry 54. The processing circuitry 54 may include a processor 56 and a memory 58. In particular, in addition to or instead of a processor, such as a central processing unit, and memory, the processing circuitry 54 may comprise integrated circuitry for processing and/or control, e.g., one or more processors 56 and/or processor cores and/or FPGAs (Field Programmable Gate Array) and/or ASICs (Application Specific Integrated Circuitry) adapted to execute instructions. The processor 56 may be configured to access (e.g., write to and/or read from) the memory 58, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Further, memory 58 may be configured as a storage device.

Hardware 52 of support node 30 may include communication interface 60 enabling it to communicate directly/indirectly with any component/device of system 10. For example, communication interface 60 may be configured for setting up and maintaining at least a wireless/wired connection with any component/device of system 10 such as user node 14a, user node 14b, and/or BSS node 18. The communication interface 60 may be formed as or may include, one or more wired communication devices, such as USB and/or ethernet devices, and/or may include one or more wireless communication devices, including one or more RF transmitters, one or more RF receivers, and/or one or more RF transceivers.

Support node 30 further has software 62 stored internally in, for example, memory 58, or stored in external memory (e.g., database, storage array, network storage device, etc.) accessible by the support node 30 via an external connection.

The processing circuitry 54 may be configured to control any of the methods and/or processes described herein and/or to cause such methods and/or processes to be performed, e.g., by support node 30. Processor 56 corresponds to one or more processors 56 for performing support node 30 functions described herein. The memory 58 is configured to store data and/or files and/or security tokens/keys, and/or programmatic software code and/or other information described herein. In some embodiments, the software 62 may include instructions that, when executed by the processor 56 and/or processing circuitry 54, causes the processor 56 and/or processing circuitry 54 to perform the processes described herein with respect to support node 30. For example, processing circuitry 54 of the support node 30 may include support configuration unit 34 and support representative user interface 36, as described herein.

Support configuration unit 34 may be configured for configuring a primary communication channel between user node 14a and a support node 30. For example, user node 14a initiates a phone call to a customer support telephone number associated with the support node 30 and/or with BSS node 18. Support node 30, complementary channel configuration unit 28, and/or BSS node 18 route the telephone call to support node 30, such that the CSR associated with support node 30 may engage in the phone conversation with user node 14a. In another example, user node 14a initiates a text-based chat session, such as via a web browser or short messaging service, SMS, associated with the support node 30 and/or with BSS node 18. Support node 30, complementary channel configuration unit 28, and/or BSS node 18 route the text-based chat to support node 30, such that the CSR associated with support node 30 may engage in the text-based conversation with user node 14*a*.

Support representative user interface 36 may be configured to cause support node 30 to display instructions for the customer support representative, e.g., statements/data/codes to read aloud to a customer over a phone connection, and an identification of information to request from the customer (e.g., customer's name, phone number, password, PIN, etc.). Support representative user interface 36 may be configured to receive data input by a customer support representative user of support node 30.

Support representative user interface 36 may be configured to receive a request from a CSR associated with support node 30 to communicate with the BSS node 18 to initiate a business process. Support node 30 may be configured to receive one or more instructions from the BSS node 18, and may be configured to display one or more of the instructions on the support representative user interface 36, simultaneously and/or sequentially. Support representative user interface 36 may be configured to receive input data from a CSR, such as a customer's phone number.

Support node 30 may be configured to forward the received input data to the BSS node 18. BSS node 18 may return a customer profile and/or other relevant data for a particular business process to the support node 30, and support node 30 may be configured to display the profile and/or other relevant data on the support representative user interface 36. Support node 30 may be configured to receive a session token from the BSS node 18, and support representative user interface 36 may be configured to display the session token, such as an alphanumeric code, to the CSR, along with an instruction to the CSR to read the code aloud to the customer, e.g., via the primary communication channel. Support node 30 may be configured to receive an indication from the BSS node 18 regarding the status of a transaction, such as an indication that a payment by the customer was successful or unsuccessful. Support representative user interface 36 may be configured to display the indication to the CSR, and prompt the CSR to communicate the indication to the customer. Support node 30 may be configured to receive an indication from the BSS node 18 that a business process is complete, and support representative user interface 36 may be configured to display the "complete" status to the CSR along with a prompt to say a predefined phrase (e.g., "goodbye") to the customer and end the call.

The system 10 further includes BSS node 18 including hardware 64. The hardware 64 may include processing circuitry 66. The processing circuitry 66 may include a processor 68 and a memory 70. In particular, in addition to or instead of a processor, such as a central processing unit, and memory, the processing circuitry 66 may comprise integrated circuitry for processing and/or control, e.g., one or more processors 68 and/or processor cores and/or FPGAs (Field Programmable Gate Array) and/or ASICs (Application Specific Integrated Circuitry) adapted to execute instructions. The processor 68 may be configured to access (e.g., write to and/or read from) the memory 58, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Further, memory 70 may be configured as a storage device.

Hardware 64 of BSS node 18 may include communication interface 72 enabling it to communicate directly/indirectly with any component/device of system 10. For example, communication interface 72 may be configured for setting up and maintaining at least a wireless/wired connection with any component/device of system 10 such as user node 14*a*, user node 14*b*, support node 30, and/or complementary communication system 26. The communication interface 72 may be formed as or may include, one or more wired communication devices, such as USB and/or ethernet devices, and/or may include one or more wireless communication devices, including one or more RF transmitters, one or more RF receivers, and/or one or more RF transceivers.

BSS node 18 further has software 74 stored internally in, for example, memory 70, or stored in external memory (e.g., database, storage array, network storage device, etc.) accessible by the BSS node 18 via an external connection.

The processing circuitry 66 may be configured to control any of the methods and/or processes described herein and/or to cause such methods and/or processes to be performed, e.g., by BSS node 18. Processor 68 corresponds to one or more processors 68 for performing BSS node 18 functions described herein. The memory 70 is configured to store data and/or files and/or security tokens/keys, and/or programmatic software code and/or other information described herein. In some embodiments, the software 74 may include instructions that, when executed by the processor 68 and/or processing circuitry 66, causes the processor 68 and/or processing circuitry 66 to perform the processes described herein with respect to BSS node 18. For example, processing circuitry 66 of the BSS node 18 may include business process orchestrator unit 22 and BSS backend unit 24, as described herein.

Business process orchestrator unit 22 may be configured to send and/or receive user account data to/from BSS backend unit 24. Business process orchestrator unit 22 may be configured to send and/or receive transaction data to/from the BSS backend unit 24, such as data for a credit card purchase. Business process orchestrator unit 22 may be configured to send instructions to support node 30, such as instructions to the user of the support node 30, e.g., a customer support representative, to request information from the customer or recite information to the customer. Business process orchestrator unit 22 may be configured to send a session token to the support node 30, such as a session token for configuring a complementary communication channel.

Business process orchestrator unit 22 may be configured to send a request to the complementary communication system 26, such as a request to initiate a complementary communication channel with user node 14*b*. Business process orchestrator unit 22 may be configured to receive a session token from the complementary communication system 26, such as a session token for configuring a complementary communication channel. Business process orchestrator unit 22 may be configured to send information (e.g., a web form, application form, document, notification, etc.) to complementary communication system 26 for sending to user node 14*b* via a complementary communication channel.

Business process orchestrator unit 22 may be configured to receive information, such as user input (e.g., credit card details, user account information, a user's electronic signature, etc.) from the complementary communication system 26 received from user node 14*b* via the complementary communication channel. Business process orchestrator unit 22 may be configured to instruct the complementary communication system 26 to terminate the complementary communication channel with user node 14*b*.

BSS backend unit 24 may be configured to receive a request from the business process orchestrator unit 22 to fetch a customer profile, and respond to such request by sending the requested customer profile to the business process orchestrator unit 22. BSS backend unit 24 may be configured to receive an instruction from business process orchestrator unit 22 to process a payment, e.g., a customer credit card purchase. BSS backend unit 24 may be configured to communicate/interface with a third-party credit card processor, financial institution, or similar entity for effecting a customer's transaction. BSS backend unit 24 may be configured to return an indication of the transaction status to the business process orchestrator unit 22, e.g., an indication that the customer's payment was successfully processed. BSS backend unit 24 may be configured for sending data to the support representative user interface 36 for display to the customer support representative user of support node 30, receiving input data from support representative user interface 36, e.g., data input by the customer support representative.

The system 10 further includes complementary communication system 26 including hardware 76. The hardware 76 may include processing circuitry 78. The processing circuitry 78 may include a processor 80 and a memory 82. In particular, in addition to or instead of a processor, such as a central processing unit, and memory, the processing circuitry 78 may comprise integrated circuitry for processing and/or control, e.g., one or more processors 80 and/or processor cores and/or FPGAs (Field Programmable Gate Array) and/or ASICs (Application Specific Integrated Circuitry) adapted to execute instructions. The processor 80 may be configured to access (e.g., write to and/or read from) the memory 82, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Further, memory 82 may be configured as a storage device.

Hardware 76 of complementary communication system 26 may include communication interface 84 enabling it to communicate directly/indirectly with any component/device of system 10. For example, communication interface 84 may be configured for setting up and maintaining at least a wireless/wired connection with any component/device of system 10 such as user node 14*a*, user node 14*b*, support node 30, and/or BSS node 18. The communication interface 84 may be formed as or may include, one or more wired communication devices, such as USB and/or ethernet devices, and/or may include one or more wireless communication devices, including one or more RF transmitters, one or more RF receivers, and/or one or more RF transceivers.

Complementary communication system 26 further has software 86 stored internally in, for example, memory 82, or stored in external memory (e.g., database, storage array, network storage device, etc.) accessible by the complementary communication system 26 via an external connection.

The processing circuitry 78 may be configured to control any of the methods and/or processes described herein and/or to cause such methods and/or processes to be performed, e.g., by complementary communication system 26. Processor 80 corresponds to one or more processors 80 for performing complementary communication system 26 functions described herein. The memory 82 is configured to store data and/or files and/or security tokens/keys, and/or programmatic software code and/or other information described herein. In some embodiments, the software 86 may include instructions that, when executed by the processor 80 and/or processing circuitry 78, causes the processor 80 and/or processing circuitry 78 to perform the processes described herein with respect to complementary communication system 26. For example, processing circuitry 78 of the complementary communication system 26 may include complementary channel configuration unit 28, as described herein.

Complementary channel configuration unit 28 may be configured to receive a request from a BSS node 18 and/or business process orchestrator unit 22 to initiate a complementary communication channel. Complementary channel configuration unit 28 may be configured to generate and send a session token to the BSS node 18 and/or business process orchestrator unit 22 for initiating and/or authenticating the complementary communication channel. Complementary channel configuration unit 28 may be configured to receive, from user node 14*b*, the session token, and to join the complementary communication channel with the primary communication channel into a synchronized logical session. Complementary channel configuration unit 28 may be configured to bypass the support node 30 in communications sent and/or received via the complementary communication channel to/from the user node 14*b*. Complementary channel configuration unit 28 may be configured to receive a web form, application form, document, or other data from BSS node 18 and/or business process orchestrator unit 22.

Complementary channel configuration unit 28 may be configured to push a web form, application form, document, notification, or other data to the user node 14*b* via the complementary communication channel. Complementary channel configuration unit 28 may be configured to receive data from user node 14*b*, such as data input into the web form or application form, an electronic signature from the user/customer of user node 14*b*, additional authentication information (e.g., a password, PIN, security question, security code, etc.), payment details, etc. Complementary channel configuration unit 28 may be configured to forward the information/data received from user node 14*b* to BSS node 18 and/or business process orchestrator unit 22, without such information being sent to or visible from the support node 30. Complementary channel configuration unit 28 may be configured to receive a request from BSS node 18 and/or business process orchestrator unit 22 to terminate the complementary communication channel.

Figure 3:
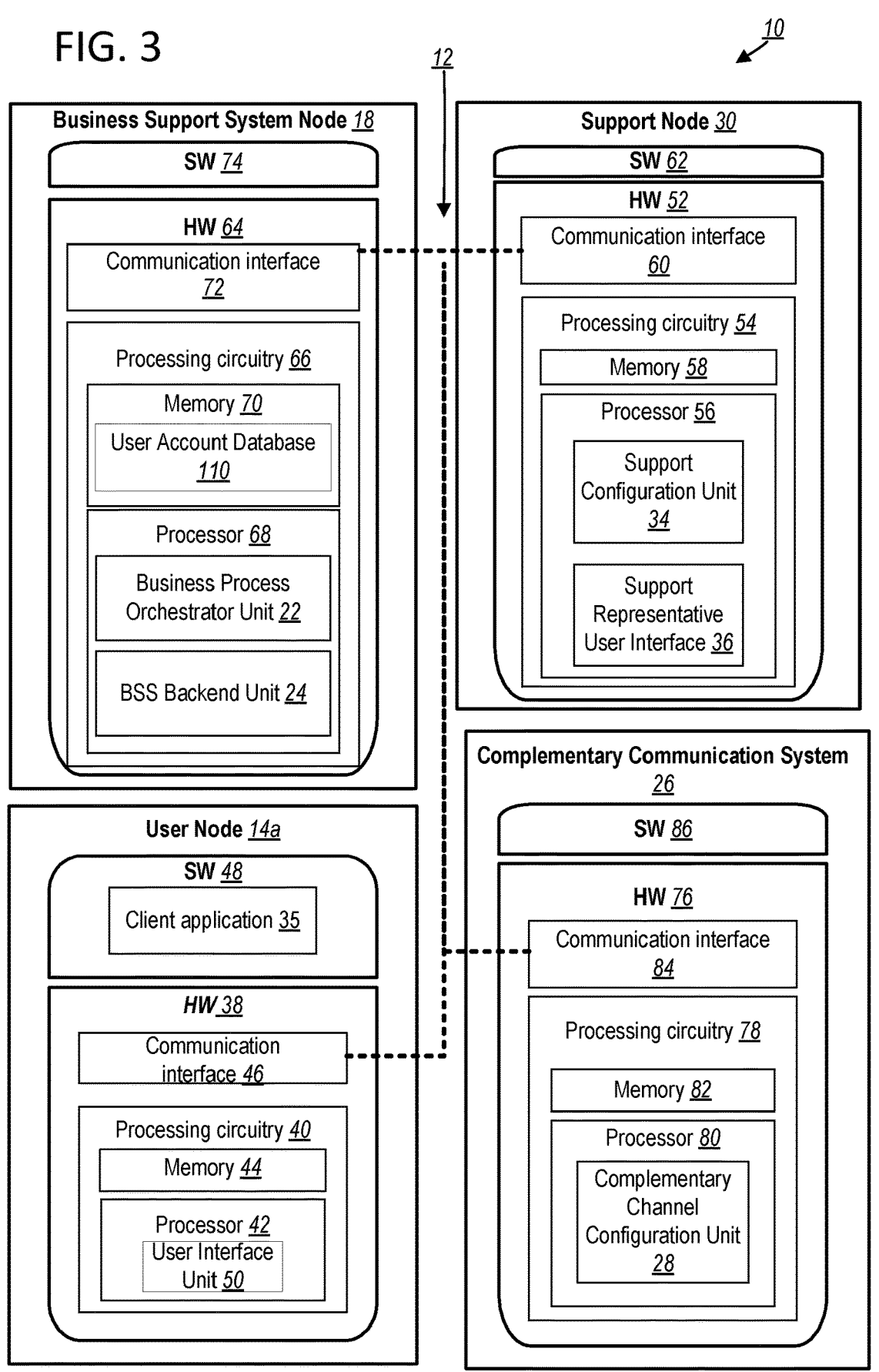
FIG. 3 is a block diagram of some devices in the system according to some embodiments of the present disclosure.
Figure 4:
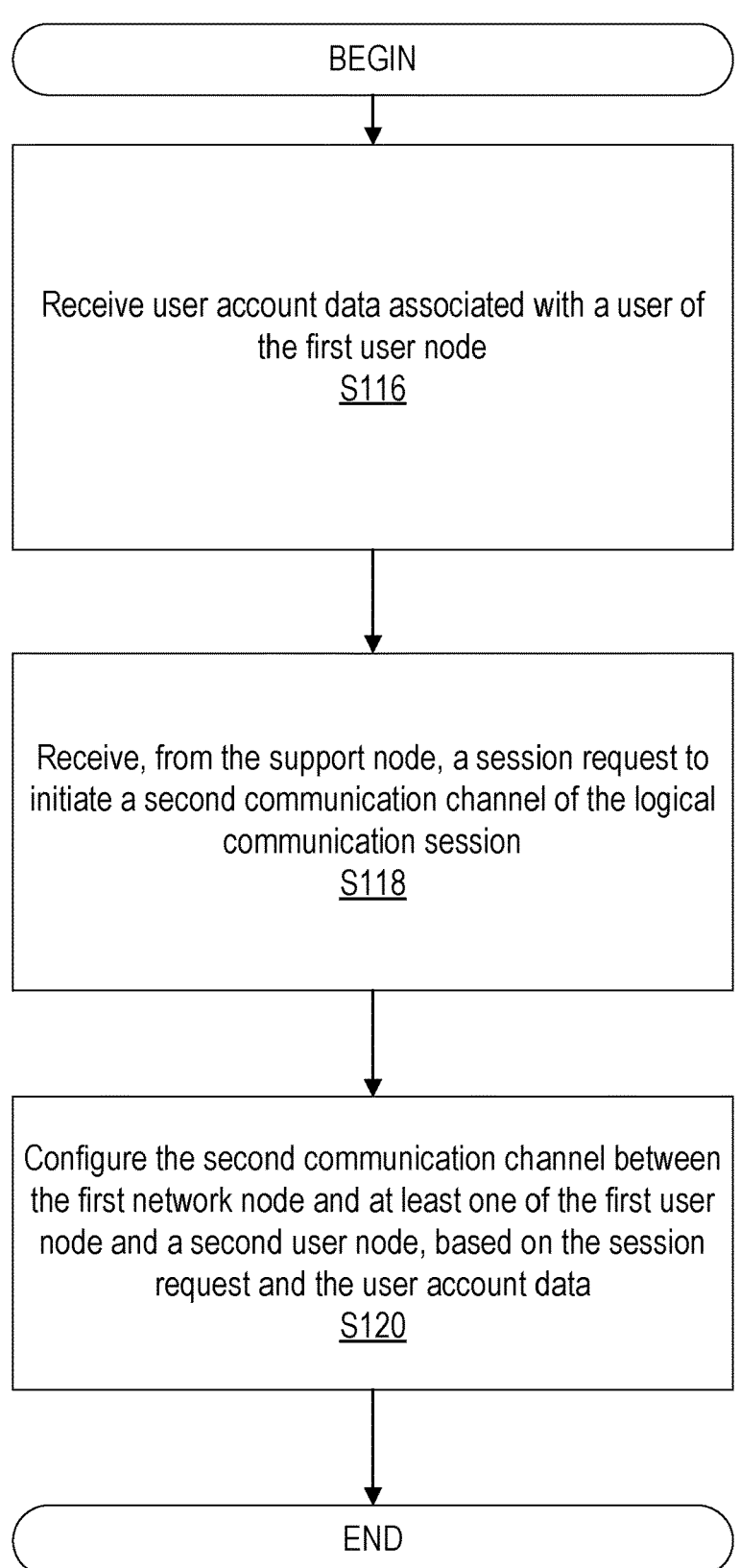
FIG. 4 is a flowchart of an example process for synchronized communication channels in a communication system for customer support according to some embodiments of the present disclosure.

Although FIGS. 2 and 3 show various "units" such as support configuration unit 34, business process orchestrator unit 22, complementary channel configuration unit 28 and BSS backend unit 24 as being within a respective processor, it is contemplated that these units may be implemented such that a portion of the unit is stored in a corresponding memory within the processing circuitry. In other words, the units may be implemented in hardware or in a combination of hardware and software within the processing circuitry FIG. 4 is a flowchart of an example process in a first network node, such as BSS node 18, for communications for customer support using a synchronized logical session of a primary communication channel and a complementary communication channel. One or more blocks described herein may be performed by one or more elements of the first network node (BSS node 18) such as by one or more of processing circuitry 66 (including the business process orchestrator unit 22 and/or BSS backend unit 24), processor 68, and/or communication interface 72. The first network node (BSS node 18) is configured to receive user account data associated with a user of the first user node 14*a* (Block S116), receive from the support node 30 a session request to initiate a second communication channel of the logical communication session (Block S118), and configure the second communication channel between the first network node (BSS node 18) and at least one of the first user node 14a and a second user node 14b, based on the session request and the user account data (Block S120).

In an embodiment, the first communication channel and second communication channel are synchronized to a predefined business process associated with the logical communication session. In an embodiment, the initiation of the second communication channel is configured to occur at a first time instance for a first type of predefined business process, and at a second time instance for a second type of predefined business process, wherein the second time instance is different from the first time instance.

In an embodiment, configuring the second communication channel includes sending a request to a complementary communication system 26, receiving a session token for the second communication channel, communicating the session token to the first network node (BSS node 18) by at least one of sending the session token to the support node 30 along with an instruction to the support node 30 to share the session token with at least one of the first user node 14a and the second user node 14b, sending the session token to a user email address identified in the user account data, and sending the session token as a push request to at least one user application 35 identified in the user account data and associated with at least one of the first user node 14a and the second user node 14b; and authenticating the second communication channel using the session token.

In an embodiment, the first network node (BSS node 18) receives a fetch request from the support node 30, and sends a data request to the complementary communication system 26 for forwarding through the second communication channel to at least one of the first user node 14a and the second user node 14b. The first network node (BSS node 18) receives, from the complementary communication system 26, in response to the data request, user input data through the second communication channel from at least one of the first user node 14a and the second user node 14b. The first network node (BSS node 18) validates the received user input data, forwards the validated user input data to the support node 30, and receives, in response to the forwarding, a confirmation message from the support node 30. The first network node (BSS node 18), in response to the confirmation message, terminates the second communication channel.

In an embodiment, the first network node (BSS node 18) receives a fetch request from the support node 30, where the fetch request is associated with a predefined business process. In response to the fetch request, the first network node (BSS node 18) sends a data request to the complementary communication system 26 for forwarding through the second communication channel to at least one of the first user node 14a and the second user node 14b based on the fetch request and the predefined business process. The first network node (BSS node 18) receives, from the complementary communication system 26, in response to the data request, user input data through the second communication channel from at least one of the first user node 14a and the second user node 14b, where the user input data is inaccessible by the support node 30. The first network node (BSS node 18) performs at least one transaction associated with the user input data and sends an instruction to the support node 30, where the instruction is based on a status of the predefined business process.

In an embodiment, when the first network node (BSS node 18) sends, through the second communication channel, the data request, the first network node (BSS node 18) generates a data packet based on the fetch request, the user account data, and the predefined business process, where the data packet is configured to communicate with a user interface of at least one of the first user node 14a and the second user node 14b, allowing access to at least one of the first user node 14a and the second user node 14b to at least one of a webpage, an application, an image, and a portable document format, PDF, document, via the complementary communication system 26, based on a format of the generated data packet.

In an embodiment, the first communication channel is voiced-based, and the second communication channel is data-based.

Figure 5:
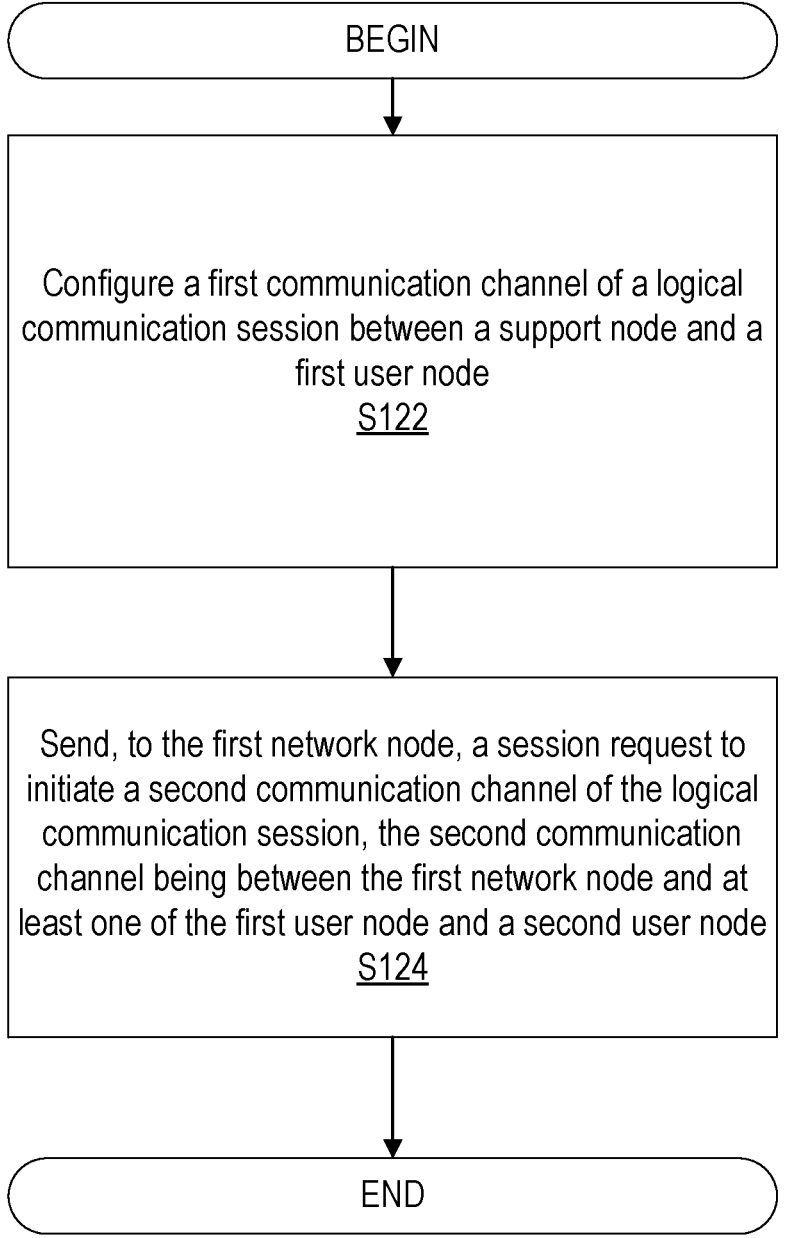
FIG. 5 is a flowchart of another example process for synchronized communication channels in a communication system for customer support.

FIG. 5 is a flowchart of an example process in a support node 30 according to some embodiments of the present disclosure. One or more blocks described herein may be performed by one or more elements of support node 30, such as by one or more of processing circuitry 54 (including the support configuration unit 34 and/or support representative user interface 36), processor 56, and/or communication interface 60. Support node 30 is configured to configure a first communication channel of a logical communication session between a support node 30 and a first user node 14a (Block S122), and send, to the first network node (BSS node 18), a session request to initiate a second communication channel of the logical communication session, the second communication channel being between the first network node (BSS node 18) and at least one of the first user node 14a and a second user node 14b (Block S124).

In an embodiment, the first communication channel and second communication channel are synchronized to a predefined business process associated with the logical communication session. In some embodiments, the second communication channel bypasses the support node 30, such that the support node 30 is unable to view any communications transported via the second communication channel.

Having described the general process flow of arrangements of the disclosure and having provided examples of hardware and software arrangements for implementing the processes and functions of the disclosure, the sections below provide details and examples of arrangements for using multiple channels in a synchronized logical communication session.

The present disclosure applies to scenarios when a customer is taking assisted services from a person face-to-face, as a nonlimiting example, going to a reseller shop to buy a phone plan and subscribing for a monthly payment based post-paid plan and, as part of that process, sharing the customer's sensitive information like social security number, address, and credit card details or bank account details for recurring payment. The approach as described in this present disclosure may also apply to such face-to-face interactions in a brick-and-mortar store.

One element in this process is "information sharing," such as when the customer shares information with the CSR, and/or the CSR shares CSR shares confirmation details with the customer.

The present disclosure applies to scenarios where there is an interaction between a CSR (e.g., via support node 30 using an assisted channel) and an end user (e.g., customer), in which there is a need to share information. The present disclosure thus provides techniques for securing/hiding sensitive information from involved parties (mainly the CSR), a better way to share information than reciting a phonetic alphabet, and an improved customer experience and accessibility. Additionally, since the information is shared with an alternate synchronized channel like web app or phone app, there is the further benefit of more efficiently translating the information that the CSR provides into a user preferred language.

In some embodiments of the present disclosure, for every session, call, or interaction that a CSR (via support node 30) or assisted channel support person has with a customer, both the parties have a possibility to initiate a child/embedded parallel session on a channel that has better accessibility and security for capturing/sharing information. And both the parties (the CSR and the customer), based on the journey/interaction type, have the ability to prompt each other with information, which could also be directly between the user and the backend system without involving the second user (e.g., entering credit card details could be between customer and backend, with no info made visible to the CSR).

As another example, a customer calls (via a regular voice phone line) a CSR to purchase a phone plan, and the CSR and the customer agree on the plan selection. For payment, the customer receives a short code/SMS which the customer can use to start a synchronized, complementary channel/session on a browser on a phone, tablet, or personal computer. The customer sees a screen to enter the payment info, which is directly processed by a backend system, and the CSR receives only a confirmation that the payment was successful/unsuccessful, and the remainder of the customer interaction continues over the phone. This type of synchronous channel can be used for providing info, e.g., the CSR asks the customer for the customer's name and address, and instead of using a phonetic alphabet or other traditional approach to recite the name and address letter-by-letter, the end user/customer instead types it on the web browser and the information reaches the CSR's front end tool that the CSR is capturing the information on. In this scenario, the additional browser on the customer's phone, tablet, or personal computer, is not a different interaction, but is rather part of same interaction, but is merely a branch out on a different communication channel of the same synchronized, logical communication session.

The participants/nodes in one or more embodiments are: the end user node(s) 14, the support node 30 (operated by the CSR), the business support system node 18, and the complementary communication system 26.

The end user (also referred to as the customer) associated with user nodes 14 is the user that is the customer to the "business system," and who needs some support for a "journey," "use case," or support request on the business system node. The CSR is the customer support representative, who is typically a human powering the assisted channel, although it may be a chatbot, interactive voice response system, or similar, and is associated with a support node 30. For example, if the end user has an issue, and needs a human to help him with a journey to be performed on the business system node.

The business system node, BSS node 18, is the backend system for which the end user needs assistance with a specific action (e.g., make a new purchase, obtain the customer's account balance, make a payment). The BSS node 18 has the core data model for the business service and has interfaces to manage the entities in the business model. The BSS node 18 includes a business process orchestrator unit 22, which manages the flow of information and instructs the CSR during the customer support journey, and the BSS backend unit 24, which may include the core data model. The business process orchestrator unit 22 may be part of the BSS backend unit 24, or the BSS backend unit 24 may be part of the business process orchestrator unit 22. The core data model may reside in the business process orchestrator unit 22 and/or in the BSS backend unit 24. Non-limiting examples of a BSS node 18 include a BSS node 18 that allows buying and managing a cellular telephone plan, and a BSS node 18 for making airline and hotel reservations.

The complementary communication system 26 provides at least one service which complements the "business system" on the backend. This complementary communication system 26 provides a secondary/complementary channel to the primary communication mode (such as a phone call, on which the customer's user node 14a originally connected to the support node 30). The complementary channel is set up by the support node 30 (e.g., operated by the CSR) and/or the BSS node 18, and once established, may be used to provide and/or obtain information to user nodes 14a and/or 14b. The end user, via user nodes 14a and/or 14b, can directly interact with the BSS node 18 via this alternate complementary communication channel, rather than verbally reciting the information to the support node 30 (e.g., operated by the CSR). The same provision is also available to the support node 30 (e.g., operated by the CSR) for scenarios where the support node 30 needs to share any information with the user nodes 14a and/or 14b.

When the end user associated with one or more user nodes 14 sets up a primary communication channel with the support node 30, such as a phone call or text-based chat, the support node 30 and/or BSS node 18 initiates setting up a complementary channel for the end user. The communication over the phone or digital chat is the primary communication channel, and the web/data channel is set as the complementary communication channel to support communication. The two channels, primary and complementary, are synchronized as a single logical communication session. That is, the two channels are combined into a single logical communication session, such that the primary communication channel and the complementary communication channel are both associated with the same user (e.g., both user nodes 14a and 14b), BSS node 18, a business process instance, and/or support node 30, and synchronized such that the BSS node 18 and/or business process orchestrator unit 22 may simultaneously send/receive data from the user node(s) via either channel.

The security of this channel can be set up in multiple ways, including, without limitation, generating a short code that is provided/recited by the support node 30 to the user nodes 14a and/or 14b, and the user node 14b navigates to a fixed URL, which may also be provided/recited by the support node 30, and the user node 14b receives aa short code entered by the user into a web page associated with the fixed URL to join the session. The BSS node 18 and/or the complementary communication system 26 uses the entered short code to associate the complementary channel with the primary channel, the user nodes 14a and 14b, support node 30, and/or the end user's customer support journey. The BSS node 18 may maintain a database of information associated with the user of user nodes 14a and 14b, including, for example, an email address, a text-message enabled phone number, and a smartphone application 35 installed on user node 14b. Therefore, in another example, the BSS node 18 and/or the complementary communication channel may send, to an email associated with the end user of user nodes 14, a link for initiating the secondary communication channel. The end user may open his email, such as on the end user's smartphone or PC (e.g., user node 14b), and clicks the link in the email, which may then open a web browser with a form for inputting the information to be exchanged via the complementary communication channel. The user may also then be prompted to enter a short code, similar to the previous example. In another example, the BSS node 18 and/or the complementary communication system 26 may send, to a smartphone application 35 associated with the end user's user node 14b, a push notification. For example, the smartphone application 35 may be an application published by the business entity from which the end user is seeking customer support. The user node 14b receives the push notification, which may, for example, request an approval from the end user to confirm the initiation of the complementary communication channel.

For added security, the setup may include a two-way handshake, in which, when the user node 14b joins the secondary session via a browser or smartphone application 35 (i.e., client application 35), the user node 14b receives a second short code, such as a pin, that the end user associated with the user node 14b then recites to the support node 30 via the primary communication channel (e.g., entered via the CSR's support representative user interface/console 36). The BSS node 18 and/or the complementary communication system 26 confirms that the second short code entered in the support node 30 matches the expected short code, which ensures both parties, the support node 30 and the user node(s) 14, belong to the same communication channel and there is no leak or breach of information. The complementary channel may be protected using various techniques that are known in the art, such as HTTPS.

Once the channel is set up, then each time during the customer support journey in which the support node 30 requires the user node(s) 14 to provide some information (e.g., credit card details for payment) to the support node 30 and/or the BSS node 18, or any time that the support node 30 needs to share any information with the user node(s) 14 (e.g., share shopping cart content before purchase is executed, or share airline flight details before buying the ticket), the support node 30 (e.g., as directed by a CSR via a support user interface toolbox), would have a facility to prompt an interaction with the user node(s) 14 over the complementary communication channel, which shows the user node 14a and/or user node 14b a page or form on the complementary communication channel web portal (e.g., displaying a webpage in a web browser of a user node 14). This enables the user node(s) 14 to provide any information (e.g., credit card details) or display information to a user of the user node 14 and request the user to confirm accuracy (e.g., review a quote summary).

In addition to or as an alternative to the above example, the BSS node 18 and/or the complementary communication system 26 may generate one or more data packets (collectively referred to as data packet). The data packet may be a webpage, such as a data structure including hypertext markup language, HTML, code/data; and/or may include multimedia, images, and/or documents; and/or may be a push notification; and/or may be a headless data structure (i.e., a data structure not in an HTML format or similar code/data format(s), and/or a data structure that cannot be rendered by user node(s) 14 without translation, e.g., by an application running on user node(s) 14 which is configured for such translation). For example, the data packet may include a data structure such as an application programming interface, API, data structure, e.g., JavaScript Object Notation, JSON, or Extensible Markup Language, XML code/data.

The user node(s) 14 and/or user interface unit 50 which receive the data packet on the complementary communication channel reads, interprets, renders, and/or translates the data packet and/or data structures, such as the HTML, API, JSON, or XML code/data, and, based on the format of the data packet and/or the data structure(s)/code/data contained therein, user node(s) 14 and/or user interface unit 50 present it to the end user (e.g., by displaying a web page, web form, application, multimedia, text to speech conversion etc.) and/or receives input from the user. For example, the data packet may include an encrypted image which is configured to only display on an authorized user node 14 which contains the appropriate decryption keys. As another example, the data packet may include a secure PDF that may requires a signature from the user of user node 14a and/or user node 14b, and/or may only be viewed by user node(s) 14 which are authorized to view the PDF. As another example, the data packet may include an API data structure and/or push notification data structure which is configured to be read/interpreted/rendered by an application running on user node(s) 14 and/or user interface unit 50, such as an airline reservation application which is configured to interpret the data packet, which may include data (e.g., a user's travel itinerary and/or a form for the user to enter credit card details, etc.) for display on user node(s) 14 and/or user interface unit 50 (e.g., displaying the user's travel itinerary and/or displaying a form for the user to enter credit card details to purchase tickets based on the displayed itinerary).

Further, with the complementary channel, for all data that has to be shared between the user node(s) 14 and the support node 30, or between the BSS node 18 to the user node(s), does not need to go through the support node 30 (e.g., where it would be visible to the CSR), but rather is provided to the user node(s) 14 via this complementary channel.

The mechanism described herein does not necessarily enforce all communication to go via the complementary channel. Whether the complementary channel is selected may depend on the type of journey, which may define the steps which require use of the complementary channel to exchange information, and may define steps where use of the complementary channel is optional based on the preferences of the end user, the sensitivity of the information being transmitted, the complexity of the transaction, legal or privacy requirements of the end user's jurisdiction, or the difficult in pronouncing or spelling the information to be exchanged.

In some embodiments, both the customer, via user node 14, and the CSR, via support node 30, can initiate a parallel channel of communication that has better accessibility for capture and/or sharing information. Both the customer, via user node 14, and the CSR, via support node 30, may prompt each other with information, based on the journey type or use case type. In some embodiments, the customer, via user node 14, may enter information, such as credit card details, in the user node 14 through the parallel/complementary channel/session such that the entered information is sent directly from the customer to the BSS node 18 without the support node 30 or the user of support node 30 (e.g., the CSR) having visibility to the entered information. In some embodiments, the support node 30 receives an indication from the BSS node 18 indicating that the customer successfully entered the information via the parallel/complementary channel, without the support node 30 or the user of support node 30 (e.g., the CSR) being able to view the entered information. In some embodiments, the BSS node 18 may prompt the support node 30 to re-request the information from the user node 14, for example, if the BSS node 18 determines that the entered information is invalid.

In some embodiments, the customer, via user node 14, may request that the CSR, via support node 30, enter information through the parallel/complementary channel. The support node 30 and/or the BSS node 18 may send information, such as subscription plan details, to the user node 14 via the parallel/complementary channel.

In some embodiments, a customer, via user node 14, initiates a support call via a plain old telephone service, POTS, call, the customer requesting to purchase a cellular subscription. The CSR, via support node 30, provides to the customer, via the voice phone call, a short code and/or a uniform resource locator, URL. The customer uses the user interface unit 50 of the user node 14b, the short code and/or the URL to navigate to a web portal, for example, a web portal associated with the URL. In some embodiments, the web portal is run on a server that is part of the BSS node 18 and/or complementary communication system 26. In some embodiments, the web portal is run on a server that is separate from and in communication with the BSS node 18 and/or complementary communication system 26.

In some embodiments, the customer enters the short code into a web portal displayed on the user interface unit 50 of the user node 14b, which initiates the complementary communication channel. In some embodiments, the web portal is configured to, in response to receiving a correct short code (i.e., the input short code matches the expected short code), to display an input form for the customer to enter information on the user interface unit 50 of the user node 14b. In some embodiments, the web portal is configured to, in response to receiving a correct short code, display information on the user interface unit 50 for the customer to review, such as subscription plan details.

Figure 6:
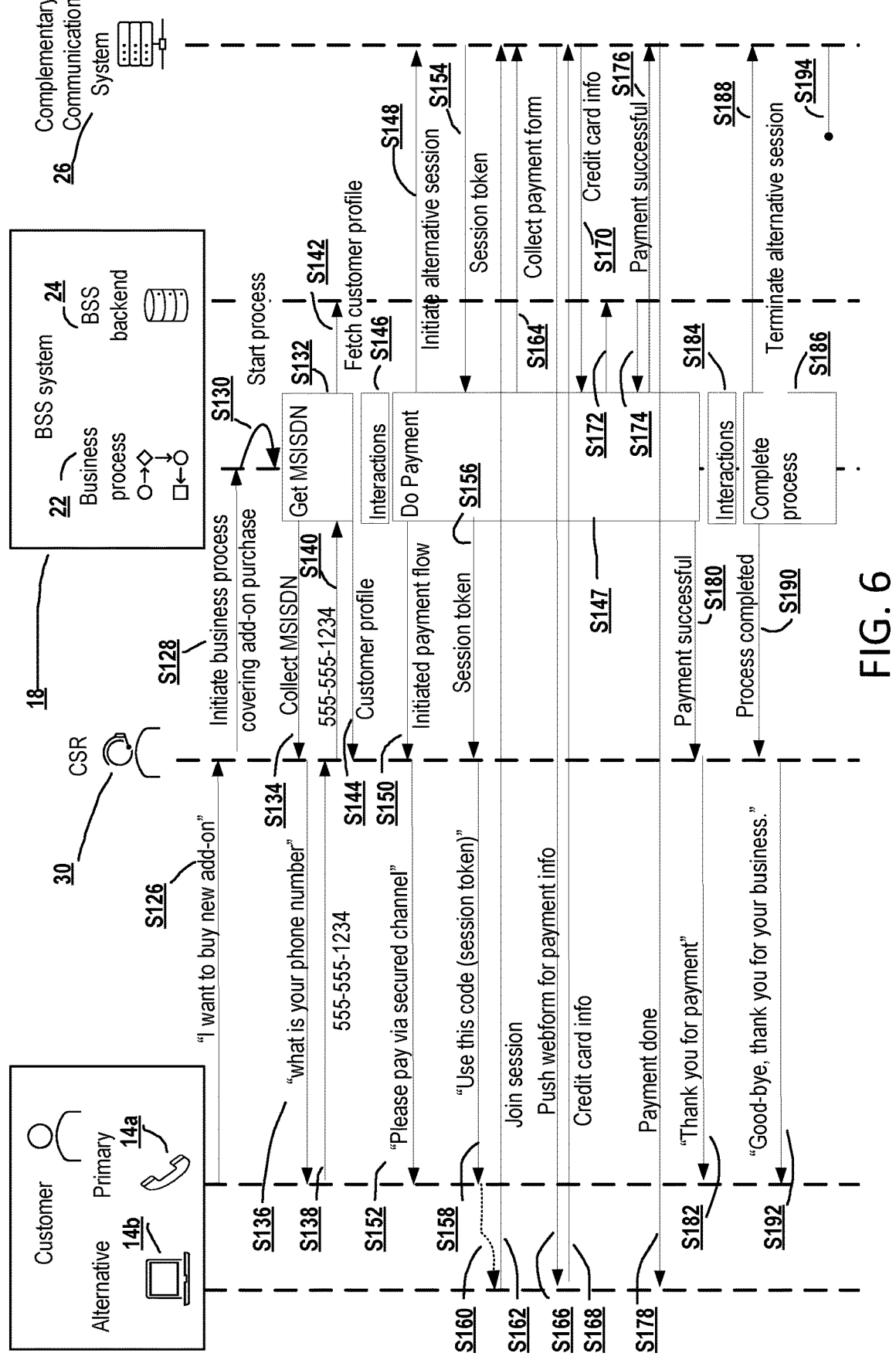
FIG. 6 is a signal diagram corresponding to some embodiments of the present disclosure.

FIG. 6 is a signaling diagram of an example embodiment of the present disclosure. A customer communicates using a primary device, i.e., user node 14a, such as a telephone, and an alternative device, i.e., user node 14b, such as a laptop computer, smartphone, or any other device with a user interface that is capable of sending and receiving data over a network such as the internet. The customer, using user node 14a, communicates with a support node 30 (e.g., operated by a CSR). A business support system, BSS node 18, including a business process orchestrator unit 22 and a BSS backend unit 24 is in communication with the support node 30 and the customer's devices, user node 14a and user node 14b. A complementary communication system 26 is in communication with the BSS node 18 and the customer's alternative devices, user node 14a and/or user node 14b.

Still referring to FIG. 6, at step S126, the customer, via the primary device, user node 14a and a primary communication channel, communicates a request to the support node 30. For example, the request may be a request to purchase a new add-on to a mobile phone subscription plan. At step S128, the support node 30 (e.g., operated by a CSR), sends a request to the BSS node 18 to initiate a business process instance for the add-on purchase. At step S130, the BSS node 18 starts the business process instance, e.g., using the business process orchestrator unit 22. At step S132, the BSS node 18 determines the requisite customer data, such as the customer's Mobile Subscriber Integrated Services Digital Network Number, MSISDN, associated with the business process instance. At step S134, the business process orchestrator unit 22 sends an instruction to the support node 30 to collect the MSISDN from the customer. At step S136, the support node 30 communicates with user node 14a (i.e., the customer's primary device) via the primary communication channel to request the customer's phone number from the customer (e.g., by verbally requesting the information). At step S138, the user node 14a (i.e., the customer's primary device), communicates the requested phone number to the support node 30 via the primary communication channel (e.g., by the customer verbally reciting the phone number). At step S140, the support node 30 forwards the customer's phone number to the BSS node 18.

At step S142, the BSS node 18 business process orchestrator unit 22, based on the received customer phone number, fetches the associated customer profile from the BSS backend unit 24. At step S144, the BSS node 18 communicates relevant details of the customer's profile (e.g., customer's plan details, customer's preferred name and pronouns, customer's demographic information) to the support node 30. At step S146, the BSS node 18 (e.g., business process orchestrator unit 22) may provide the support node 30 with instructions for interactions with the customer, such as determining what purchases the customer wishes to make. At step S147, the BSS node 18 (e.g., using business process orchestrator unit 22) initiates the payment process. At step S148, the BSS node 18 (e.g., using business process orchestrator unit 22) instructs the complementary communication system 26 to initiate an alternative session, such as a complementary communication channel, using complementary channel configuration unit 28.

At step S150, the BSS node 18 (e.g., using business process orchestrator unit 22) instructs the support node 30 to initiate the payment process flow. At step S152, the support node 30 communicates, via the user node 14a (i.e., the customer's primary device), an instruction to the user node 14a to make a payment via a complementary communication channel. At step S154, the complementary communication system 26 (e.g., using complementary channel configuration unit 28) communicates a session token, such as an alphanumeric code, to the BSS node 18. At step S156, the BSS node 18 communicates the session token to the support node 30. At step S158, the support node 30 communicates, via user node 14a (i.e., the customer's primary device), an instruction for the user node 14a to use the session token. At step S160, user node 14b (i.e., the customer's alternative device) receives customer input of the session token, such as by the customer entering the alphanumeric code of the session token into a web portal accessible from a web browser on user node 14b and/or user interface unit 50 of user node 14b.

At step S162, user node 14b (i.e., the customer's alternate device) communicates to the complementary communication system 26 (e.g., using complementary channel configuration unit 28) to join the session. At step S164, the BSS node 18 sends a collect payment webform message to the complementary communication system 26, which may include a webform for collecting payment and/or instructions to the complementary communication system 26 for constructing such a webform. At step S166, the complementary communication system 26 (e.g., using complementary channel configuration unit 28) pushes the webform to the customer's alternative device, user node 14b, which may appear on the web portal on the alternative device's web browser, which the customer may interact with using user interface unit 50 of user node 14b. At step S168, the user interface unit 50 of user node 14b receives information from the customer via the web form on user node 14b (i.e., the customer's alternative device), such as receiving credit card details, receives an indication that the user has clicked "Submit" on the web form, and user node 14b sends the input information to the complementary communication system 26 via the secondary communication channel.

At step S170, the complementary communication system 26 forwards the input information, such as the credit card information, to the BSS node 18 and/or business process orchestrator unit 22. At step S172, the business process orchestrator unit 22 instructs the BSS backend unit 24 to perform payment based on the received credit card information, such as by submitting the credit card information and purchase details to a remote credit card processor (not shown in FIG. 6).

At step S174, the BSS backend unit 24 informs the business process orchestrator unit 22 that the payment was successfully processed (or unsuccessfully processed). At step S176, the BSS node 18 and/or business process orchestrator unit 22 communicates to the complementary communication system 26 that the payment was successful (or unsuccessfully processed). At step S178, the complementary communication system 26 (e.g., using complementary channel configuration unit 28), communicates to the customer, via the user node 14b (i.e., the customer's alternative device), that the payment was successfully processed (or unsuccessfully processed). At step S180, the BSS node 18 informs support node 30 that the payment was successfully processed (or unsuccessfully processed). At step S182, the support node 30 informs the user node 14a (i.e., the customer's primary communication device and via the primary communication channel), that the payment was successfully processed (or unsuccessfully processed).

At step S184, the BSS node 18 may provide for additional customer interactions (e.g., providing the customer with an account balance, making additional purchases, etc.). At step S186, the BSS node 18, e.g., using business process orchestrator unit 22, begins the "complete process" flow. At step S188, the BSS node 18 instructs the complementary communication system 26 to terminate the alternative session. At step S190, the BSS node 18 instructs the support node 30 that the process is completed. At step S192, the support node 30 informs user node 14a (i.e., the customer's primary communication device), that the process is complete, and terminates that connection to the user node 14a (e.g., by ending the phone call with user node 14a). At step S194, the complementary communication system 26, e.g., using complementary channel configuration unit 28, terminates the complementary communication channel to user node 14b.

Hence, one or more embodiments described herein advantageously enables the use of more than one channel (improved accessibility) under a logical communication session, and allows seamless push or pull of information from two heterogenous technology sessions that are synchronized to the same business instance/process.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method performed by a first network node that is in communication with a support node, the support node being configured to communicate with a first user node using a first communication channel for a first communication session, the method comprising:

receiving user account data associated with a user of the first user node;

receiving, from the support node, a session request to initiate a second communication channel for a second communication session that bypasses the support node but that is logically joined to the first communication session to create a single logical communication session, the first communication channel being voiced-based, and the second communication channel being data-based, the support node being unable to view any communications transported via the second communication channel; and configuring the second communication channel between the first network node and at least one of the first user node and a second user node, based on the session request and the user account data, the first communication session and the second communication session being synchronized to a predefined business process associated with the logical communication session where the first network node simultaneously sends and receives data from at least one of the first user node and second user node via the first communication channel or the second communication channel.

2. The method of claim 1, wherein the initiation of the second communication channel is configured to occur:

at a first time instance for a first type of predefined business process; and at a second time instance for a second type of predefined business process, the second time instance being different from the first time instance.

3. The method of claim 1, wherein the configuring of the second communication channel comprises:

sending a request to a complementary communication system;

receiving a session token for the second communication channel;

communicating the session token to the first network node by at least one of:

sending the session token to the support node along with an instruction to the support node to share the session token with at least one of the first user node and the second user node;

sending the session token to a user email address identified in the user account data; and sending the session token as a push request to at least one user application identified in the user account data and associated with at least one of the first user node and the second user node; and authenticating the second communication channel using the session token.

4. The method of claim 1, further comprising:

receiving a fetch request from the support node;

sending a data request to the complementary communication system for forwarding through the second communication channel to at least one of the first user node and the second user node;

receiving, from the complementary communication system, in response to the data request, user input data through the second communication channel from at least one of the first user node and the second user node;

validating the received user input data;

forwarding the validated user input data to the support node;

receiving, in response to the forwarding, a confirmation message from the support node; and in response to the confirmation message, terminating the second communication channel.

5. The method of claim 1, further comprising:

receiving a fetch request from the support node, the fetch request being associated with a predefined business process;

in response to the fetch request, sending a data request to the complementary communication system for forwarding through the second communication channel to at least one of the first user node and the second user node based on the fetch request and the predefined business process;

receiving, from the complementary communication system, in response to the data request, user input data through the second communication channel from at least one of the first user node and the second user node, the user input data being inaccessible by the support node;

performing at least one transaction associated with the user input data; and sending an instruction to the support node, the instruction being based on a status of the predefined business process.

6. The method of claim 5, wherein sending, through the second communication channel, the data request comprises:

generating a data packet based on the fetch request, the user account data, and the predefined business process, the data packet being configured to communicate with a user interface of at least one of the first user node and the second user node; and allowing access to at least one of the first user node and the second user node to at least one of:

a webpage, an application, an image, and a portable document format, PDF, document, via the complementary communication system, based on a format of the generated data packet.

7. A method performed by a support node in communication with a first network node, the method comprising:

configuring a first communication channel for a first communication session between the support node and a first user node; and sending, to the first network node, a session request to initiate a second communication channel for a second communication session that bypasses the support node but that is logically joined to the first communication session to create a single logical communication session, the first communication channel being voiced-based, and the second communication channel being data-based, the support node being unable to view any communications transported via the second communication channel, the second communication channel being between the first network node and at least one of the first user node and a second user node, the first communication session and the second communication session being synchronized to a predefined business process associated with the logical communication session where the first network node simultaneously sends and receives data from at least one of the first user node and second user node via the first communication channel or the second communication channel.

8. A first network node that is in communication with a support node, the support node being configured to communicate with a first user node using a first communication channel for a first communication session, the first network node comprising processing circuitry configured to:

receive user account data associated with a user of the first user node;

receive, from the support node, a session request to initiate a second communication channel for a second communication session that bypasses the support node but that is logically joined to the first communication session to create a single logical communication session, the first communication channel being voiced-based, and the second communication channel being data-based, the support node being unable to view any communications transported via the second communication channel; and configure the second communication channel between the first network node and at least one of the first user node and a second user node, based on the session request and the user account data, the first communication session and the second communication session being synchronized to a predefined business process associated with the logical communication session where the first network node simultaneously sends and receives data from at least one of the first user node and second user node via the first communication channel or the second communication channel.

9. The first network node of claim 8, wherein the initiation of the second communication channel is configured to occur:

at a first time instance for a first type of predefined business process; and at a second time instance for a second type of predefined business process, the second time instance being different from the first time instance.

10. The first network node of claim 8, wherein the configuring of the second communication channel comprises:

sending a request to a complementary communication system;

receiving a session token for the second communication channel;

communicating the session token to the first network node by at least one of:

sending the session token to the support node along with an instruction to the support node to share the session token with at least one of the first user node and the second user node;

sending the session token to a user email address identified in the user account data; and sending the session token as a push request to at least one user application identified in the user account data and associated with at least one of the first user node and the second user node; and authenticating the second communication channel using the session token.

11. The first network node of claim 8, wherein the processing circuitry is further configured to:

receive a fetch request from the support node;

send a data request to the complementary communication system for forwarding through the second communication channel to at least one of the first user node and the second user node;

receive, from the complementary communication system, in response to the data request, user input data through the second communication channel from at least one of the first user node and the second user node;

validate the received user input data;

forward the validated user input data to the support node;

receive, in response to the forwarding, a confirmation message from the support node; and in response to the confirmation message, terminate the second communication channel.

12. The first network node of claim 8, wherein the processing circuitry is further configured to:

receive a fetch request from the support node, the fetch request being associated with a predefined business process;

in response to the fetch request, send a data request to the complementary communication system for forwarding through the second communication channel to at least one of the first user node and the second user node based on the fetch request and the predefined business process;

receive, from the complementary communication system, in response to the data request, user input data through the second communication channel from at least one of the first user node and the second user node, the user input data being inaccessible by the support node;

perform at least one transaction associated with the user input data; and send an instruction to the support node, the instruction being based on a status of the predefined business process.

13. The first network node of claim 12, wherein sending, through the second communication channel, the data request comprises:

generating a data packet based on the fetch request, the user account data, and the predefined business process, the data packet being configured to communicate with a user interface of at least one of the first user node and the second user node; and allowing access to at least one of the first user node and the second user node to at least one of:

a webpage, an application, an image, and a portable document format, PDF, document, via the complementary communication system, based on a format of the generated data packet.

14. A support node in communication with a first network node, the support node comprising processing circuitry configured to:

configure a first communication channel for a first communication session between the support node and a first user node; and send, to the first network node, a session request to initiate a second communication channel for a second communication session that bypasses the support node but that is logically joined to the first communication session to create a single logical communication session, the first communication channel being voiced-based, and the second communication channel being data-based, the support node being unable to view any communications transported via the second communication channel, the second communication channel being between the first network node and at least one of the first user node and a second user node, the first communication 5 session and the second communication session being synchronized to a predefined business process associated with the logical communication session where the first network node simultaneously sends and receives data from at least one of the first user node and second 10 user node via the first communication channel or the second communication channel.

*     *     *     *     *